US012675394B2

(12) United States Patent
Sahasrabudhe et al.

(10) Patent No.: US 12,675,394 B2
(45) Date of Patent: Jul. 7, 2026

(54) SELECTIVE FABRIC-LESS MODE FOR STORAGE SYSTEM OPERATIONS

(71) Applicant: Dell Products L.P., Round Rock, TX (US)

(72) Inventors: Kaustubh Sahasrabudhe, Westborough, MA (US); Steve Ivester, Grafton, MA (US); Ramesh Doddaiah, Westborough, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/950,805

(22) Filed: Nov. 18, 2024

(65) Prior Publication Data

US 2026/0140862 A1     May 21, 2026

(51) Int. Cl.
*G06F 12/02*          (2006.01)
(52) U.S. Cl.
CPC .......... *G06F 12/0223* (2013.01); *G06F 12/02* (2013.01); *G06F 12/023* (2013.01)
(58) Field of Classification Search
CPC ..... G06F 12/0223; G06F 12/02; G06F 12/023
USPC ................................................ 711/154, 100
See application file for complete search history.

(56) References Cited

U.S. PATENT DOCUMENTS

2022/0179804 A1*   6/2022   Anchi ................ G06F 11/2094

* cited by examiner

*Primary Examiner* — Hosain T Alam
*Assistant Examiner* — Zubair Ahmed
(74) *Attorney, Agent, or Firm* — Krishnendu Gupta; Nikhil Patel

(57)          ABSTRACT

Aspects of the present disclosure relate to optimizing atomic operations in storage arrays by selectively enabling fabric-less mode based on device access patterns. In embodiments, whether multi-path software is enabled is determined, and device-level access control mappings are analyzed to identify candidates for fabric-less mode operation. For devices without multi-path software, a fabric-less mode is enabled when mapped to a single board, allowing atomic operations via software locks instead of fabric hardware. When multi-path software is enabled, the embodiments either leverage ALUA states to identify optimized paths or employ time series analysis using ARIMA models to predict IO access patterns. Fabric-less mode is activated when forecasting indicates localized access patterns, significantly improving response time and IOPS by avoiding fabric bandwidth constraints and hardware vendor limitations. The embodiments enable efficient atomic operations through CPU access to local memory, eliminating unnecessary fabric operations while maintaining data consistency across the storage array.

16 Claims, 6 Drawing Sheets

600 receiving input/output (IO) operations at a storage array having multiple boards

602 determining path characteristics corresponding to a logical device targeted by one or more of the IO operations

604 selectively enabling or disabling fabric-less mode for the logical device based on the determined path characteristics or IO access patterns corresponding to the logical device

606

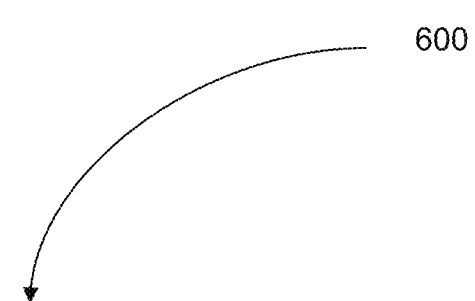

600 receiving input/output (IO) operations at a storage array
having multiple boards

602 determining path characteristics corresponding to a
logical device targeted by one or more of the IO
operations

604 selectively enabling or disabling fabric-less mode for the
logical device based on the determined path
characteristics or IO access patterns corresponding to
the logical device

SELECTIVE FABRIC-LESS MODE FOR STORAGE SYSTEM OPERATIONS

BACKGROUND

Enterprise storage arrays commonly employ multi-node (e.g., multiple boards) systems with fabric hardware to handle atomic operations across a globalized cache. These systems utilize specialized fabric switches and hardware to manage distributed memory access and ensure atomicity for input/output (IO) operations. In traditional implementations, fabric operations coordinate access across multiple boards or nodes within the storage array, enabling consistent data access and atomic operations through hardware-based synchronization mechanisms. The industry standard approach for systems with multiple nodes relies on fabric hardware working with a globalized cache to maintain data consistency and handle inter-node atomic operations.

SUMMARY

One or more aspects of the present disclosure relate to adaptive device-level memory access control. In embodiments, input/output (IO) operations at a storage array having multiple boards are received. In addition, path characteristics corresponding to a logical device targeted by one or more of the IO operations are determined. Further, a fabric-less mode for the logical device is selectively enabled or disabled based on the determined path characteristics or IO access patterns corresponding to the logical device.

In embodiments, whether multi-path software is enabled for the logical device in the storage array can be determined by analyzing logical device-level access control mappings.

In embodiments, if multi-path software is not enabled for the logical device, whether the logical device is mapped to a single board can be determined, and fabric-less mode for the logical device can be enabled to perform atomic operations using software locks instead of fabric hardware.

In embodiments, if multi-path software is enabled for the logical device, local and remote access statistics for the logical device can be collected, the access statistics can be analyzed using a time series forecasting model to predict future access patterns, and fabric-less mode for the logical device can be selectively enabled or disabled based on the predicted access patterns.

In embodiments, software-based locks can be used to perform atomic operations on local memory via central processing unit (CPU) access instead of using fabric hardware operations.

In embodiments, whether Asymmetric Logical Unit Access (ALUA) states are enabled for the logical device can be determined. Additionally, whether the logical device has a single ALUA optimized path can be determined when ALUA states are enabled. Further, the fabric-less mode for the logical device can be enabled when the logical device has a single ALUA optimized path.

In embodiments, an ARIMA (Autoregressive Integrated Moving Average) time series model can be used to forecast whether future IO operations will be localized to a specific board.

In embodiments, the fabric-less mode can be enabled when the forecasting model predicts approximately 100% local access for a logical device during a next time window.

In embodiments, if fabric-less mode is enabled, atomic operations using only CPU accesses to local memory can be performed without utilizing fabric hardware, and IO response time and IOs per second (IOPS) can be improved by avoiding fabric bandwidth constraints.

In embodiments, IO bias to specific paths or boards corresponding to the storage array can be periodically checked when multi-path software is enabled. In addition, IO patterns for a next time window can be predicted based on the detected IO bias.

Other technical features may be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts throughout the different views. The drawings are not necessarily to scale, emphasis instead being placed upon illustrating the embodiments' principles.

FIG. 6 is a flow diagram of a method for selectively enabling or disabling a fabric-less mode for a logical device per embodiments of the present disclosure.

DETAILED DESCRIPTION

In enterprise storage systems, multi-node storage arrays commonly handle input/output (IO) operations across multiple boards or directors. These systems traditionally rely on specialized fabric hardware and switches to perform atomic operations on a global memory area, ensuring data consistency across the distributed system.

Current naive approaches for systems with multiple nodes use fabric hardware operations when working with a globalized cache. However, these fabric operations introduce significant latency costs and can lead to unnecessary congestion in storage arrays. For example, when a host initiates an IO operation that requires accessing memory on a different board, the system must utilize fabric hardware to ensure atomic operations, resulting in increased response times of up to 7-10 microseconds compared to local memory access.

This performance impact is particularly problematic in two common scenarios. First, when customers manually configure host applications to specific boards without multi-path software, the system performs unnecessary fabric operations even though the devices are mapped to specific boards. Second, IO operations may be biased toward specific devices during certain time windows in systems using host multi-path software. Yet, the system continues to use fabric operations rather than exploiting potential locality.

Additionally, hardware vendor limitations, such as a maximum 256-bit limit on atomic operations, further constrain performance and increase storage array latency. While some storage arrays attempt to address this through Asymmetric Logical Unit Access (ALUA) states to direct IOs to specific paths, there hasn't been a comprehensive solution to optimize performance across different configuration scenarios.

Embodiments of the present disclosure optimize performance by selectively enabling a fabric-less mode that uses software-based locks for atomic operations instead of fabric hardware. This solution dynamically adapts to different system configurations-whether using multi-path software or direct device mapping—and can significantly improve response time and IOPS while reducing reliance on fabric bandwidth. The embodiments intelligently determine when to enable fabric-less mode based on device mapping patterns, ALUA states, and sophisticated time-series analysis of IO access patterns.

Figure 1:
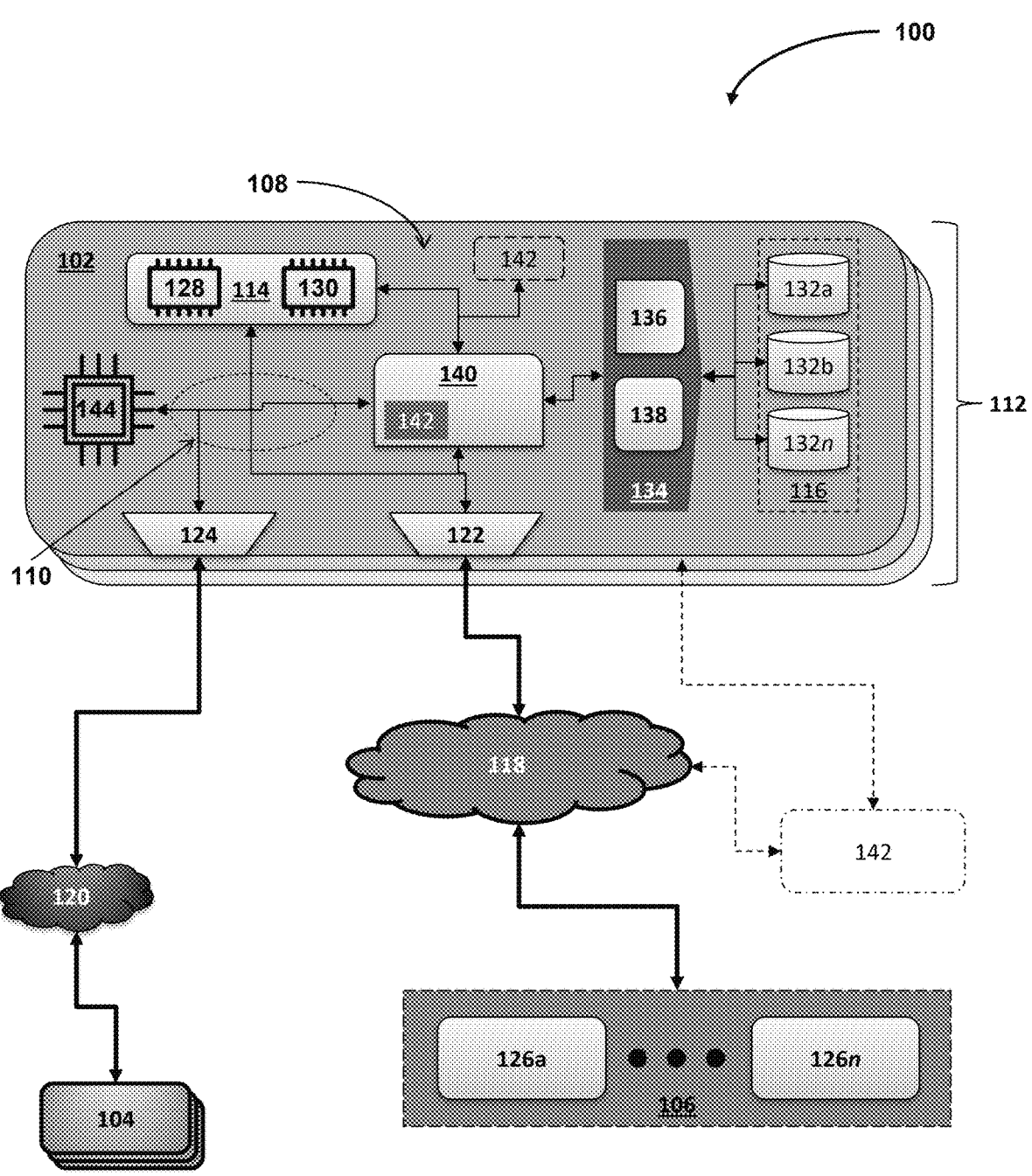
FIG. 1 illustrates a distributed network environment in accordance with embodiments of the present disclosure.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110 like Fibre channels, busses, and communication modules that communicatively couple the components 108. Further, the distributed network environment 100 can define an array cluster 112, including the storage array 102 and one or more other storage arrays.

In embodiments, the storage array 102, components 108, and remote system 104 can include a variety of proprietary or commercially available single or multi-processor systems (e.g., parallel processor systems). Single or multi-processor systems can include central processing units (CPUs), graphical processing units (GPUs), and others. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), an Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. The communication nodes can also include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126a-n, running one or more applications. The applications can require one or more of the storage array's services. Accordingly, each application can send one or more input/output (IO) messages (e.g., a read/write request or other storage service-related request) to the storage array 102 over the network 118. Further, the IO messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache IO messages and their respective data payloads. Additionally, the memory 114 can include local memory (LM 130) that stores instructions that the storage array's processors 144 can execute to perform one or more storage-related services. For example, the storage array 102 can have a multi-processor architecture that includes one or more CPUs (central processing units) and GPUs (graphical processing units).

In addition, the storage array 102 can deliver its distributed storage services using persistent storage 116. For example, the persistent storage 116 can include multiple thin-data devices (TDATs) such as persistent storage drives 132a-n. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102 can include a device interface (DI 134) that manages access to the array's persistent storage 116. For example, the DI 134 can include a disk adapter (DA 136) (e.g., storage device controller), flash drive interface 138, and the like that control access to the array's persistent storage 116 (e.g., storage devices 132a-n).

Likewise, the storage array 102 can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126a-n) remote/distributed storage services by virtualizing the storage array's memory/storage resources (memory 114 and persistent storage 116, respectively).

In embodiments, the storage array 102 can also include a controller 142 (e.g., management system controller) that can reside externally from or within the storage array 102 and one or more of its components 108. When external from the storage array 102, the controller 142 can communicate with the storage array 102 using any known communication connections. For example, the communications connections can include a serial port, parallel port, network interface card (e.g., Ethernet), etc. Further, the controller 142 can include logic/circuitry that performs one or more storage-related services.

In embodiments, the controller 142 can implement a fabric-less mode architecture that operates differently depending on whether multi-path software is enabled. For systems without multi-path software, the controller 142 can process incoming host IO operations by examining logical device-level access control (ACLX) mappings to determine if logical devices are mapped to single boards (e.g., one of the boards En:Bn of FIG. 1). When a logical device is mapped to a single board, the controller 142 can automatically enable fabric-less mode for that logical device.

For systems with multi-path software and Asymmetric Logical Unit Access (ALUA) enabled, the controller 142 can examine logical device-level ACLX mappings and evaluate the ALUA states for each path. For example, the controller 142 can look for logical devices with a single ALUA optimized path with all other paths designated as non-optimized. When such a configuration is detected, the controller 142 can enable fabric-less mode for that logical device until the ALUA states change.

Complex scenarios can occur when multi-path is enabled, but ALUA is disabled, or multiple optimized paths are present. In this case, the controller 142 can implement a sophisticated analysis pipeline that begins by collecting local and remote access statistics for each logical device. The controller 142 can feed these statistics into an ARIMA (Autoregressive Integrated Moving Average) time series forecasting model that analyzes access patterns to predict future IO behavior. The controller 142 can maintain separate statistics for local and remote board access counts, which are synchronized periodically through a low-priority background task.

Based on the ARIMA model's predictions, the controller 142 can make decisions about turning fabric-less mode on or off for specific logical devices during defined time windows. If the model predicts, e.g., approximately 100% local access for a logical device on a particular board during a given time window, the controller 142 can enable fabric-less mode for that logical device. Conversely, if the model predicts a mix of local and remote accesses, the controller 142 can have the logical device remain in regular fabric mode. When fabric-less mode is enabled, the controller 142 can use software-based locks (like Peterson locks) for atomic operations instead of relying on fabric hardware, significantly improving performance by avoiding fabric bandwidth constraints and reducing latency.

In embodiments, the controller 142 can implement a feedback loop where access patterns are continuously monitored and predictions are updated, allowing the controller 142 to dynamically adjust fabric-less mode settings based on changing IO patterns. This adaptive approach ensures optimal performance while maintaining data consistency through appropriate atomic operation handling, whether through software locks in fabric-less mode or traditional fabric hardware operations in regular mode.

Figure 2:
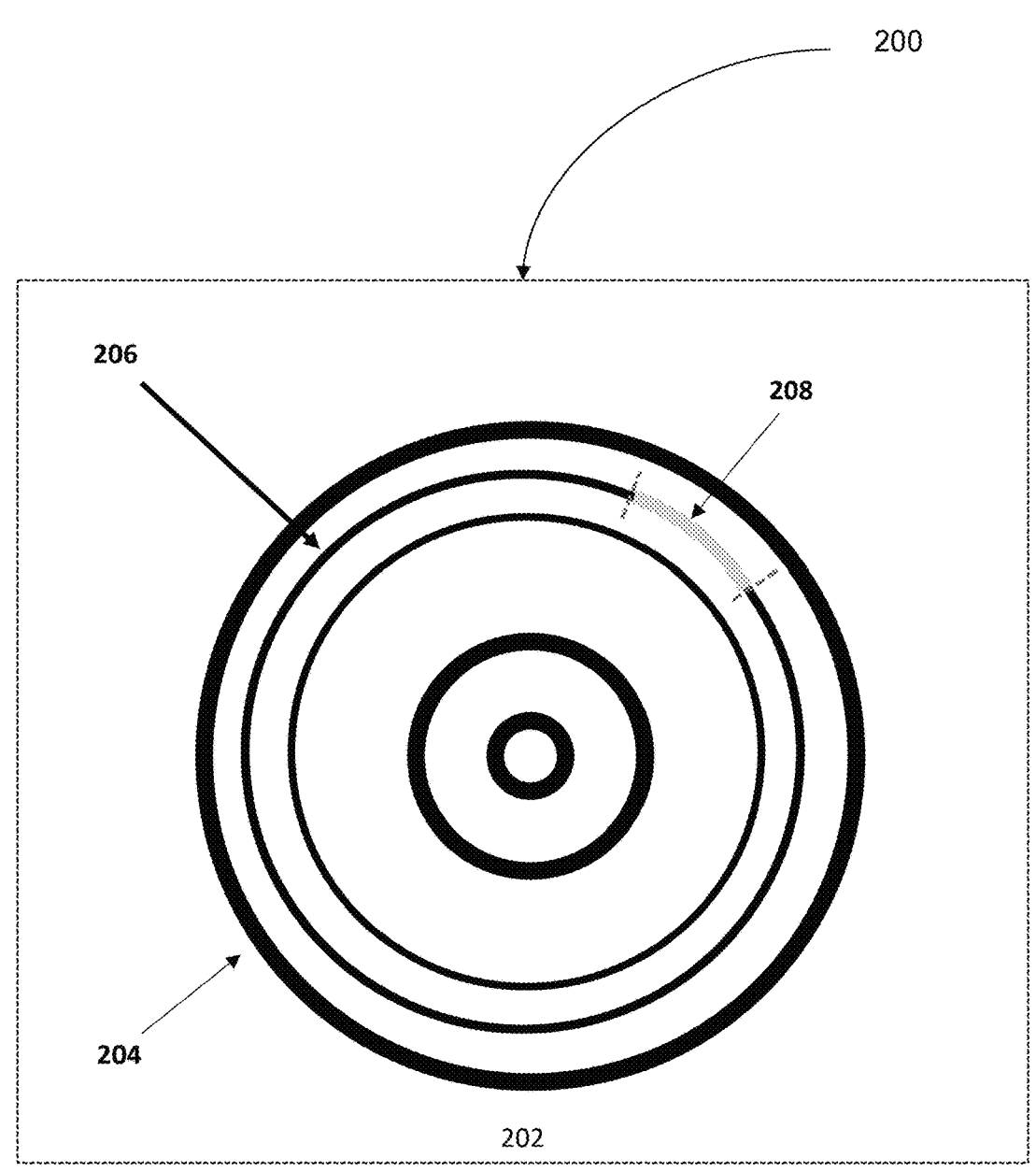
FIG. 2 is a cross-sectional view of a storage device in accordance with embodiments of the present disclosure.

Regarding FIG. 2, the storage array's EDS 140 can virtualize the array's persistent storage 116. Specifically, the EDS 140 can virtualize a storage device 200, which is substantially like one or more of the storage devices 132*a-n*.

For example, the EDS 140 can provide a host, e.g., client machine 126*a*, with a virtual storage device (e.g., thin-device (TDEV)) that logically represents zero or more portions of each storage device 132*a-n*. For example, the EDS 140 can establish a logical track using zero or more physical address spaces from each storage device 132*a-n*. Specifically, the EDS 140 can establish a continuous set of logical block addresses (LBA) using physical address spaces from the storage devices 132*a-n*. Thus, each (LBA) represents a corresponding physical address space from one of the storage devices 132*a-n*. For example, a track can include 256 LBAs, amounting to 128 kb of physical storage space. Further, the EDS 140 can establish the TDEV using several tracks based on the desired storage capacity of the TDEV. The EDS 140 can also establish extents that logically define a group of tracks.

In embodiments, the EDS 140 can provide each TDEV with a unique identifier (ID) like a target ID (TID). Additionally, EDS 140 can establish a logical unit number (LUN) that maps each track of a TDEV to its corresponding physical track location using pointers. Further, the EDS 140 can also generate a searchable data structure, mapping logical storage representations to their corresponding physical address spaces. Thus, EDS 100 can enable the HA 122 to present the hosts 106 with the logical storage representations based on host or application performance requirements.

For example, the persistent storage 116 can include an HDD 202 with stacks of cylinders 204. Like a vinyl record's grooves, each cylinder 204 can include one or more tracks 206. Each track 206 can include continuous sets of physical address spaces representing each of its sectors 208 (e.g., slices or portions thereof). The EDS 140 can provide each slice/portion with a corresponding logical block address (LBA). The EDS 140 can also group sets of continuous LBAs to establish one or more tracks. Further, the EDS 140 can group a set of tracks to establish each extent of a virtual storage device (e.g., TDEV). Thus, each TDEV can include tracks and LBAs corresponding to one or more of the persistent storage 116 or portions thereof (e.g., tracks and address spaces).

As stated herein, the persistent storage 116 can have distinct performance capabilities. For example, an HDD architecture is known by skilled artisans to be slower than an SSD's architecture. Likewise, the array's memory 114 can include different memory types, each with distinct performance characteristics described herein. In embodiments, the EDS 140 can establish a storage or memory hierarchy based on the SLA and the performance characteristics of the array's memory/storage resources. For example, the SLA can include one or more Service Level Objectives (SLOs) specifying performance metric ranges (e.g., response times and uptimes) corresponding to the hosts' performance requirements.

Further, the SLO can specify service level (SL) tiers corresponding to each performance metric range and categories of data importance (e.g., critical, high, medium, low). For example, the SLA can map critical data types to an SL tier requiring the fastest response time. Thus, the storage array 102 can allocate the array's memory/storage resources based on an IO workload's anticipated volume of IO messages associated with each SL tier and the memory hierarchy.

For example, the EDS 140 can establish the hierarchy to include one or more tiers (e.g., subsets of the array's storage and memory) with similar performance capabilities (e.g., response times and uptimes). Thus, the EDS 140 can establish fast memory and storage tiers to service host-identified critical and valuable data (e.g., Platinum, Diamond, and Gold SLs). In contrast, slow memory and storage tiers can service host-identified, non-critical, less valuable data (e.g., Silver and Bronze SLs). The EDS 140 can also define "fast" and "slow" performance metrics based on relative performance measurements of the array's memory 114 and persistent storage 116. Thus, the fast tiers can include memory 114 and persistent storage 116, with relative performance capabilities exceeding a first threshold. In contrast, slower tiers can include memory 114 and persistent storage 116, with relative performance capabilities falling below a second threshold. Further, the first and second thresholds can correspond to the same threshold.

Figure 3:
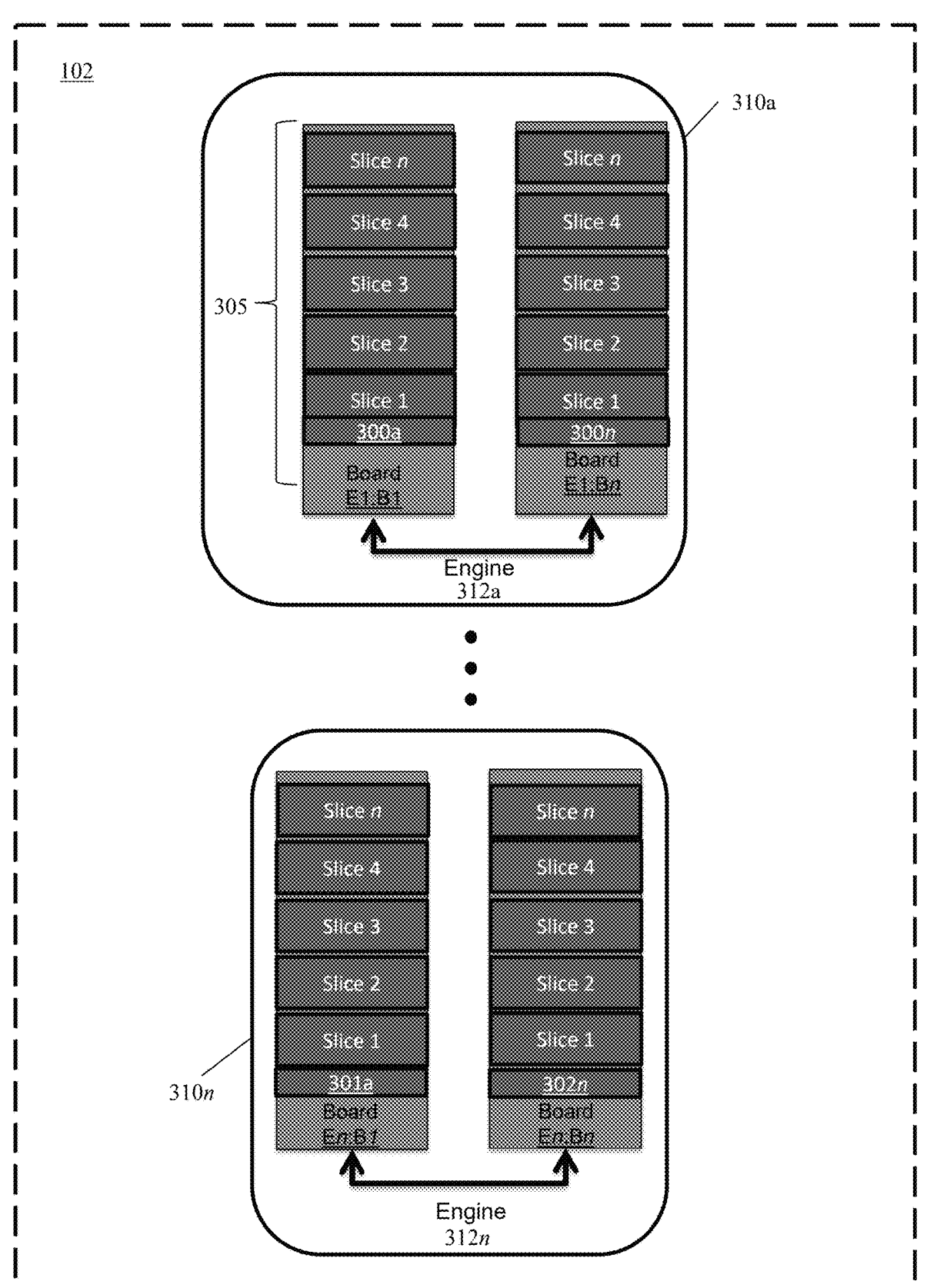
FIG. 3 is a block diagram of engines of a storage array, including director boards, in accordance with embodiments of the present disclosure.

Regarding FIG. 3, the storage array 102 includes engines 312*a-n* that deliver storage services. Each engine 312*a-n* has hardware circuitry or software components required to perform the storage services. Additionally, the array 102 can house each engine 312*a-n* in one or more of its shelves (e.g., housing) 310*a-n* that interface with the array's cabinet or rack (not shown).

In embodiments, each engine 312*a-n* can include director boards (boards) E1:B1-E1:Bn, En:B1-En:Bn. The boards E1:B1-E1:Bn, En:B1-En:Bn can have slices 305, each comprising hardware or software elements that perform specific storage services. Each board's slices 1-*n* can correspond to or emulate one or more of the storage array's components 108 described in FIG. 1. For example, each board's Slice 1 can correspond to or emulate the EDS 140 or controller 142 of FIG. 1. In embodiments, the slices 2-*n* can emulate one or more of the array's other components 101. Further, the boards B1-*n* can include memory 300*a-n*-301*a-n*, respectively. The memory 300*a-n*-301*a-n* can be dynamic random-access memory (DRAM).

In embodiments, each emulated EDS 140 (collectively "EDS 140") can provision its respective board with memory from the array's global memory 128. For example, the EDS 140 can uniformly carve out at least one global memory section into x-sized memory portions 300*a-n*-301*a-n*. Further, the EDS 140 can size each global memory section or the x-sized memory portions 300*a-n*-301*a-n* to store data structure filters like cuckoo filters. The EDS 140 can size each global memory section or the x-sized portions based on an IO workload's predicted metrics related to the amount and frequency of sequential IO write patterns. For instance, the predicted metrics can define the amount of data the x-sized memory portions 300*a-n*-301*a-n* can be required to store.

Figure 4:
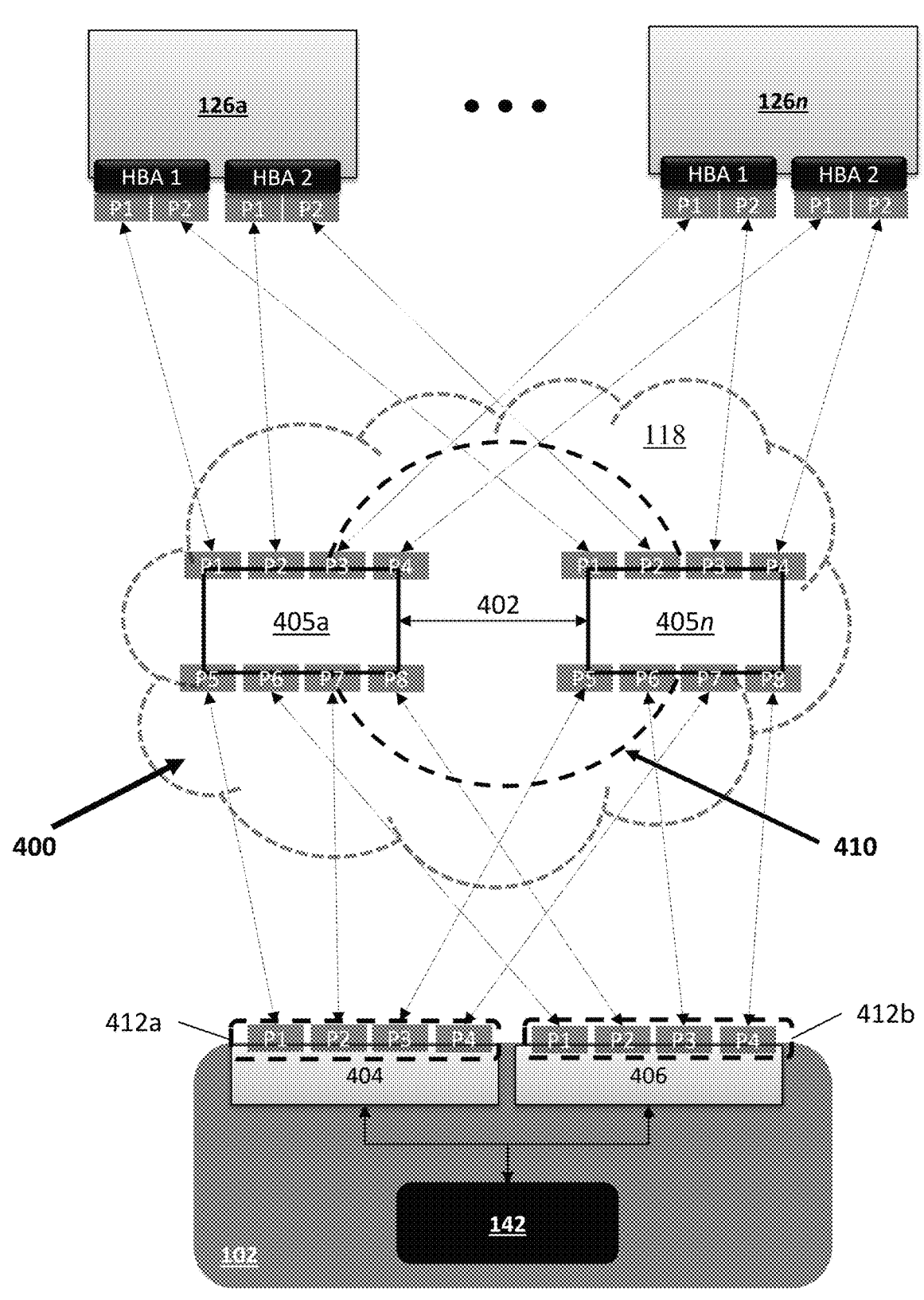
FIG. 4 is a block diagram of a communications network in accordance with embodiments of the present disclosure.

Regarding FIG. 4, a network (e.g., a storage area network) 118 can include one or more interconnected nodes (e.g., switches) 405*a-n* that define a structure and flow of information between networked devices. In embodiments, the network can interconnect the nodes 405*a-n* using links 410. The links 410 can allow the nodes 405*a-n* to exchange messages using one or more communication protocols. The communications protocols can define a method (e.g., rules, syntax, semantics, and the like) by which the nodes 405*a-n* can pass messages and signals to other networked devices. Further, the protocol can define a communications synchronization process and error recovery methods. The network 118 can implement the protocol using hardware, software, or a combination of both. The protocol's rules, syntax, and semantics can include, e.g., a circuit switching, message switching, or packet switching technique. In embodiments, the nodes 405*a-n* can comprise networking hardware such as computing nodes (e.g., computers), servers, networking hardware, bridges, switches, hubs, and the like.

For example, the nodes 405*a-n* can correspond to Fibre Channel (FC) switches connected via an inter-switch link (ISL) 402. The ISL 402 allows for communication and data transfer between switches, enabling the creation of larger fabric topologies and providing redundancy. ISLs are typically high-speed links that carry traffic between switches, allowing networked devices connected to different switches to communicate with each other as if they were on the same switch. In the context of SAN FC Zoning, ISLs are crucial in connecting multiple switches to form a larger, more flexible network infrastructure.

The network 118 can arrange the nodes 405*a-n* to define one or more of a Chain Network (CHN), Y-Network (YN), Wheel Network (WN), Circle Network (CIRN), All-Channel Network (ACN) such as a Star Network, and the like. In a CHN, the nodes 405*a-n* have a hierarchical relationship (e.g., topology) that requires communications to flow through a formal chain. In a YN, the nodes 405*a-n* have a topology resembling an upside-down 'Y' (e.g., information flows upward and downward through the hierarchy). In a WN, data flows to and from a networked device (e.g., array 102). In a CIRN, the nodes 405*a-n* have a topology that restricts the flow of information to/from one node of the nodes to an adjacent node (e.g., a neighboring node). In embodiments, each node can have at most two adjacent nodes. In an ACN, the nodes 405*a-n* have a structure that allows communications to flow upward, downward, and laterally among each node. As illustrated, the network 118 can have an arrangement 400 consistent with an ACN. In embodiments, the network 118 can define one or more communication paths between the array 102 and hosts 1226*a-n*.

In embodiments, hosts 126*a-n* can connect to the network (e.g., SAN) 119 using Host Bus Adapters (HBAs) (e.g., respective HBAs 1-2) that are substantially similar to Network Interface Cards (NICs) in Ethernet networks. Each HBA (respective HBAs 1-2) includes ports P1-2 that are assigned unique World Wide Names (WWNs). The HBA ports P1-2 can connect to switch ports (e.g., ports P1-4 of switches 405*a-n*) via Fibre Channel links.

In embodiments, FC switches (e.g., switches 405*a-n*) can include multiple ports P1-8, each with its own WWN. The switches 405*a-n* can include switch host ports P1-4 connected to hosts. The switches 405*a-n* can also include switch storage ports P5-8 connected to one or more storage arrays (e.g., the storage array 102). Further, the switches 405*a-n* can be interconnected using Inter-Switch Links (ISLs) for redundancy and expanded connectivity.

In embodiments, a storage array 102 can include director boards 404/406 (e.g., substantially similar to director boards En:Bn of FIG. 3), each including a small input/output (IO) card (SLIC) 412*a-b*. Each SLIC can include multiple FC ports (e.g., ports P1-4) connected to corresponding switch storage ports P5-8 of respective switches 405*a-n*. Like other components (e.g., ports) of the network 118, the FC ports P1-4 on each SLIC 412*a-b* are assigned World Wide Names (WWNs). The SLICs 412*a-b* provide an interface between the storage array 102 and the external fabric corresponding to the network 118. Accordingly, the SLICs 412*a-b* allow the storage array 102 to connect to multiple FC switches (e.g., the FC switches 405*a-n*).

In embodiments, WWNs are unique identifiers in Fibre Channel networks, similar to IP addresses in Ethernet networks. Each networked device (e.g., HBA port, switch port, storage array port) is assigned a unique WWN. The WWNs can identify each networked device and port in the SAN 118. Additionally, the WWNs can be used to create logical zones that define which networked devices can communicate with each other. Specifically, zoning techniques use WWNs to create logical groups of networked devices that are allowed to communicate. Further, networked devices (e.g., the hosts 126*a-n*, FC switches 405*a-n*, and storage array 102) on the SAN 118 can implement multipathing techniques that use the WWNs to identify and manage multiple paths between the networked devices. Using WWNs, SAN administrators can precisely control and manage connectivity, security, and resource allocation in the Fibre Channel network, ensuring that only authorized networked devices can communicate and access specific resources.

In embodiments, the storage array 102 can include a controller 142, including a cache subsystem (not shown) that manages input/output (IO) operations received by the boards 404/406. The controller 142 can be configured to determine device-level access control (ACLX) mappings to identify whether multi-path software is enabled for logical devices in the storage array. The controller 142 analyzes the ACLX mappings for logical devices without multi-path software to determine if logical devices are mapped to specific boards rather than across multiple boards.

When multi-path is not enabled, and a logical device is mapped to a single board, the controller 142 enables fabric-less mode for that logical device, allowing atomic operations to be performed using software locks instead of fabric hardware. The software locks can operate on local memory via CPU access, achieving faster atomicity without specialized hardware.

For scenarios where multi-path software is enabled, the controller 142 can implement two distinct approaches.

First, when Asymmetric Logical Unit Access (ALUA) states are enabled, the controller 142 evaluates the ALUA states to determine optimized versus non-optimized paths. If a single ALUA-optimized path is detected for a logical device, the controller 142 enables fabric-less mode for that logical device until the ALUA states change.

Second, when ALUA is disabled or multiple optimized paths are present, the controller 142 collects and maintains local and remote access statistics for each logical device. In addition, the controller 142 can use a time series model (e.g., ARIMA (Autoregressive Integrated Moving Average)) to analyze these statistics and forecast future IO patterns. The controller 142 can also enable fabric-less mode when the forecast predicts, e.g., approximately 100% local access for a device during the next time window. For example, the controller 142 can set a feature bit for a memory page corresponding to a subject logical device to include an enabled or disabled fabric-less mode. Further, the controller 142 can update logical device-level metadata access counts, with local boards updating local access counts and remote boards updating remote access counts.

In embodiments, the controller 142 can perform the above-referenced operations periodically (e.g., every few hours) to check for IO bias to specific paths or boards. When fabric-less mode is enabled, the controller 142 can ensure atomic operations are performed using only CPU accesses to local memory without fabric hardware. This improves IO response time and IOPS by avoiding fabric bandwidth constraints.

Further, the controller 142 can synchronize local and remote access counts as a low-priority task and manage the transition between fabric and fabric-less modes based on the forecasted access patterns. This approach allows the controller 142 to optimize performance by reducing reliance on specialized fabric hardware while maintaining data consistency through software-based atomic operations.

Figure 5:
FIG. 5 is a block diagram of a controller in accordance with embodiments of the present disclosure.
Figure 5:
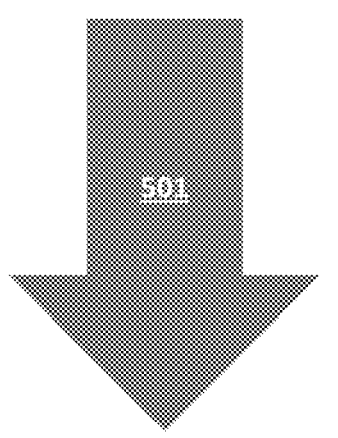
Figure 5:
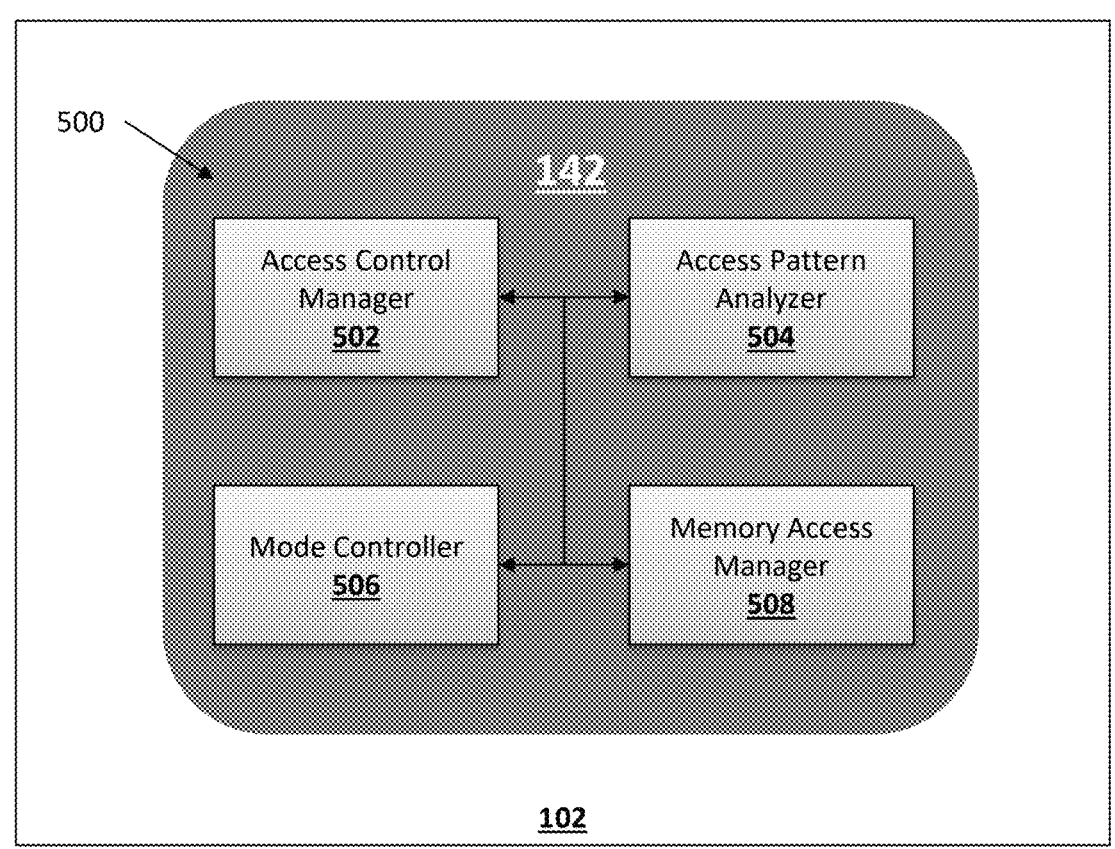

Regarding FIG. 5, a storage array 102 can receive IO operations 504 from one or more hosts 106 via a network (e.g., the network 118 of FIG. 1). In embodiments, the storage array 102 can implement an adaptive device-level memory access control mechanism that optimizes performance by selectively enabling fabric-less mode operation.

In embodiments, the storage array 102 can include a controller 142 with hardware, logic, and circuitry 500 that manage the incoming IO operations 501. For instance, the controller 142 can include an access control manager 502 that handles logical device-level ACLX mappings and ALUA state management to determine the appropriate access paths. For systems without multi-path software, the access control manager 502 detects which logical devices are mapped to specific boards through device-level access control mappings stored in memory (e.g., the global memory 128 of FIG. 1). In these cases, the controller 142 can include a mode controller 506 that enables fabric-less mode for those logical devices, allowing them to use software locks and CPU-based local memory access instead of fabric hardware operations.

When multi-path software is enabled with ALUA, the access control manager 502 evaluates the ALUA states to identify optimized versus non-optimized paths. If a single ALUA optimized path is detected for a logical device, the mode controller 506 enables fabric-less mode for that logical device until the ALUA states change.

For systems with multi-path enabled but ALUA disabled, the controller 142 can include an access pattern analyzer 504 that collects local and remote access statistics and employs an ARIMA time series forecasting model to predict IO patterns. The statistics can include read/write operations, IO sizes, and memory access locality relative to specific boards.

In embodiments, the controller 142 can include a memory access manager 508 that implements two modes of operation: fabric mode and fabric-less mode. For logical devices in fabric mode, the memory access manager 508 uses specialized hardware for atomic operations across the fabric (not shown) of the storage array 102. For logical devices in fabric-less mode, the memory access manager 508 implements software-based locks (like Peterson Lock) for local memory access via CPUs (e.g., the processors 144 of FIG. 1) of the storage array 102.

When the access pattern analyzer 504 predicts, e.g., approximately 100% local access for a device during a time window, the mode controller 506 enables fabric-less mode for that logical device. This allows atomic operations to be performed using only CPU accesses to local memory without utilizing fabric hardware, significantly improving IO response time and IOPS by avoiding fabric bandwidth constraints.

In embodiments, the access pattern analyzer 504 can periodically (every few hours) check for IO bias patterns and update the access statistics. IO bias pattern can correspond to a pattern where the IO operations 501 are predominantly directed to specific paths or boards within a storage array 102 over a given time window. The access pattern analyzer 504 can detect IO bias by collecting and analyzing IO statistics such as local and remote IO access, read/write IO operation patterns, memory access locality relative to specific boards, path-specific access patterns, and the like.

For example, IO bias can occur when host multi-path software preferentially routes IO operations to specific paths based on factors like latency, bandwidth utilization, or load balancing considerations. Additionally, IO bias can occur when ALUA (Asymmetric Logical Unit Access) states are configured to designate specific paths as "optimized" versus "non-optimized," causing IO operations to favor the optimized paths.

During low-priority tasks, the access pattern analyzer 504 can synchronize both local and remote access counts across boards of the storage array. This adaptive approach allows the controller 142 to optimize performance by enabling fabric-less mode when IO operations are predicted to be localized to specific boards.

The following text includes details of a method(s) or a flow diagram(s) per embodiments of this disclosure. For simplicity of explanation, each method is depicted and described as a set of alterable operations. Additionally, one or more operations can be performed in parallel, concurrently, or in a different sequence. Further, not all the illustrated operations are required to implement each method described by this disclosure.

Regarding FIG. 6, a method 600 relates to optimizing atomic operations in a storage system. In embodiments, the controller 142 of FIG. 1 can perform all or a subset of operations corresponding to the method 600.

For example, the method 600, at 602, can include receiving input/output (IO) operations at a storage array having multiple boards. Additionally, at 604, the method 600 can include determining path characteristics corresponding to a logical device targeted by one or more of the IO operations. Further, the method 600, at 606, can include selectively enabling or disabling fabric-less mode for the logical device based on the determined path characteristics or IO access patterns corresponding to the logical device.

Further, each operation can include any combination of techniques implemented by the embodiments described herein. Additionally, one or more of the storage array's components 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the steps of the method. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer with a display device enabling user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). For example, input from the user can be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer with a graphical user interface, a web browser through which a user can interact with an example implementation or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise when computer programs run on the respective computers and have a client-server relationship. Further, the system can include a storage array(s) that delivers distributed storage services to the client(s) or server(s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (PDA) device, laptop computer, electronic mail device), or other communication devices. The browser device includes, for example, a computer (e.g., desktop computer, laptop computer) with a World Wide Web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:

receiving input/output (IO) operations at a storage array having multiple boards;

determining path characteristics corresponding to a logical device targeted by one or more of the IO operations;

determining whether multi-path software is enabled for the logical device in the storage array by analyzing logical device-level access control mappings;

if multi-path software is not enabled for the logical device:

determining that the logical device is mapped to a single board, and enabling fabric-less mode for the logical device to perform atomic operations using software locks instead of fabric hardware; and selectively enabling or disabling fabric-less mode for the logical device based on the determined path characteristics or IO access patterns corresponding to the logical device.

2. The method of claim 1, further comprising:

if multi-path software is enabled for the logical device:

collecting local and remote access statistics for the logical device, analyzing the access statistics using a time series forecasting model to predict future access patterns, and selectively enabling or disabling fabric-less mode for the logical device based on the predicted access patterns.

3. The method of claim 1, wherein enabling fabric-less mode includes:

using software-based locks to perform atomic operations on local memory via central processing unit (CPU) access instead of using fabric hardware operations.

4. The method of claim 1, wherein when multi-path software is enabled, further comprising:

determining whether Asymmetric Logical Unit Access (ALUA) states are enabled for the logical device;

when ALUA states are enabled, determining whether the logical device has a single ALUA optimized path; and enabling fabric-less mode for the logical device when the logical device has a single ALUA optimized path.

5. The method of claim 2, further comprising:

using an ARIMA (Autoregressive Integrated Moving Average) time series model to forecast whether future IO operations will be localized to a specific board.

6. The method of claim 1, further comprising:

enabling fabric-less mode when a forecasting model predicts approximately 100% local access for a logical device during a next time window.

7. The method of claim 1, further comprising:

if fabric-less mode is enabled:

performing atomic operations using only CPU accesses to local memory without utilizing fabric hardware; and improving IO response time and IOs per second (IOPS) by avoiding fabric bandwidth constraints.

8. The method of claim 1, further comprising:

periodically checking for IO bias to specific paths or boards corresponding to the storage array when multi-path software is enabled; and predicting IO patterns for a next time window based on the detected IO bias.

9. An apparatus with a memory and processor, the apparatus configured to:

receive input/output (IO) operations at a storage array having multiple boards;

determine path characteristics corresponding to the logical device targeted by one or more of the IO operations;

determine whether multi-path software is enabled for the logical device in the storage array by analyzing logical device-level access control mappings;

if multi-path software is not enabled for the logical device:

determine that the logical device is mapped to a single board, and enable fabric-less mode for the logical device to perform atomic operations using software locks instead of fabric hardware; and selectively enable or disable fabric-less mode for the logical device based on the determined path characteristics or IO access patterns corresponding to the logical device.

10. The apparatus of claim 9, further configured to:

if multi-path software is enabled for the logical device:

collect local and remote access statistics for the logical device, analyze the access statistics using a time series forecasting model to predict future access patterns, and selectively enable or disable fabric-less mode for the logical device based on the predicted access patterns.

11. The apparatus of claim 9, wherein enabling fabric-less mode includes:

use software-based locks to perform atomic operations on local memory via central processing unit (CPU) access instead of using fabric hardware operations.

12. The apparatus of claim 9, wherein when multi-path software is enabled, further configured to:

determine whether Asymmetric Logical Unit Access (ALUA) states are enabled for the logical device;

when ALUA states are enabled, determine whether the logical device has a single ALUA optimized path; and enable fabric-less mode for the logical device when the logical device has a single ALUA optimized path.

13. The apparatus of claim 10, further configured to:

use an ARIMA (Autoregressive Integrated Moving Average) time series model to forecast whether future IO operations will be localized to a specific board.

14. The apparatus of claim 9, further configured to:

enable fabric-less mode when a forecasting model predicts approximately 100% local access for a logical device during a next time window.

15. The apparatus of claim 9, further configured to:

if fabric-less mode is enabled:

perform atomic operations using only CPU accesses to local memory without utilizing fabric hardware; and improve IO response time and IOs per second (IOPS) by avoiding fabric bandwidth constraints.

16. The apparatus of claim 9, further configured to:

periodically check for IO bias to specific paths or boards corresponding to the storage array when multi-path software is enabled; and predict IO patterns for a next time window based on the detected IO bias.

\* \* \* \* \*